United States Patent [19]

Nakashima et al.

[11] Patent Number: 5,089,354

[45] Date of Patent: Feb. 18, 1992

[54] WEAR-RESISTANT, ANTI-SEIZING COPPER ALLOY COMPOSITE MATERIALS

[75] Inventors: Kunio Nakashima; Ryouichi Ishigane; Takayuki Tanaka; Ken-ichi Ichida, all of Toyama, Japan

[73] Assignee: Chuetsu Metal Works, Co., Ltd., Toyama, Japan

[21] Appl. No.: 625,951

[22] Filed: Dec. 11, 1990

[51] Int. Cl.$^5$ .............................................. G22F 3/00
[52] U.S. Cl. .................................... 428/552; 75/232; 75/233; 75/234; 75/244; 419/8; 419/13; 419/17; 419/19; 419/23; 419/48
[58] Field of Search ................. 75/232, 233, 234, 244; 428/552; 419/8, 13, 17, 19, 23, 48

[56] References Cited

U.S. PATENT DOCUMENTS 4,935,056  6/1990  Miyasaka ............................ 75/231

Primary Examiner—Stephen J. Lechert, Jr.
Attorney, Agent, or Firm—Flynn, Thiel, Boutell & Tanis

[57] ABSTRACT

A copper alloy composite material which comprises a copper alloy matrix and at least one additive selected from solid materials having self-lubricity and wear-resistant materials and uniformly dispersed in the alloy matrix is described. The composite material has improved wear resistance and anti-seizing properties.

18 Claims, 3 Drawing Sheets

WEAR-RESISTANT, ANTI-SEIZING COPPER ALLOY COMPOSITE MATERIALS

BACKGROUND OF THE INVENTION

1. Field of the Invention

This invention relates to copper alloy composite materials which have a good wear resistance and good anti-seizing properties.

2. Description of The Prior Art:

Currently, bearing materials for machine parts have been, more and more, required to have good wear resistance and good anti-seizing properties so that they withstand high load.

Materials, such as graphite power, having self-lubricating properties and materials, such as oxides of metals including Al, Cr and the like, having a wear resistance are known in the field. When such additive materials are added to copper alloy base metals or matrices to obtain copper alloy composite materials, troubles are involved in the difference in the specific gravity between the copper alloy matrix and the additive material and the mutual wettability of the matrix and the additive material. As a result, it has been difficult to uniformly disperse the additive material in the copper alloy matrix. However, if too great attention is paid to the uniform dispersion, material defects such as cavities are developed in the copper alloy matrix. Thus, it is not possible to obtain copper alloy composite materials which have properties as required.

SUMMARY OF THE INVENTION

It is accordingly an object of the invention to provide a copper alloy composite material which overcomes the drawback of the prior material.

It is another object of the invention to provide a copper alloy composite material which has a good wear resistance and good anti-seizing properties along with good material characteristics such as tensile strength, proof stress, elongation and hardness.

It is a further object of the invention to provide a copper alloy composite material which is high in quality and inexpensive.

The above objects can be achieved, according to the invention by a copper alloy composite material which comprises a copper alloy matrix, and at least one solid additive having self-lubricity and/or at least one solid additive having a good wear resistance both in the form of powder uniformly dispersed in the copper alloy matrix.

The above and other objects, features and advantages of the present invention will become more apparent from the following description taken in conjunction with the accompanying drawings.

BRIEF DESCRIPTION OF THE DRAWINGS

FIGS. 1 to 4 are, respectively, schematic views illustrating hot extrusion of a copper alloy composite material wherein FIG. 1 is a perspective view, partially in section, of a composite material-packing capsule, FIG. 2 is a sectional view showing an extrusion press of the composite material, FIG. 3 is a schematic perspective view of a copper alloy composite material, and FIG. 4 is an enlarged, sectional view of the composite material, taken along the line A—A of FIG. 3;

FIGS. 5 to 7 are, respectively, schematic view showing application of a copper alloy composite material of the invention to hot forging wherein FIG. 5 is a perspective view corresponding to FIG. 1, FIG. 6 is a perspective view corresponding to FIG. 3, and FIG. 7 is an enlarged sectional view taken along the line B—B of FIG. 6;

DESCRIPTION OF THE PREFERRED EMBODIMENT

Figure 1:
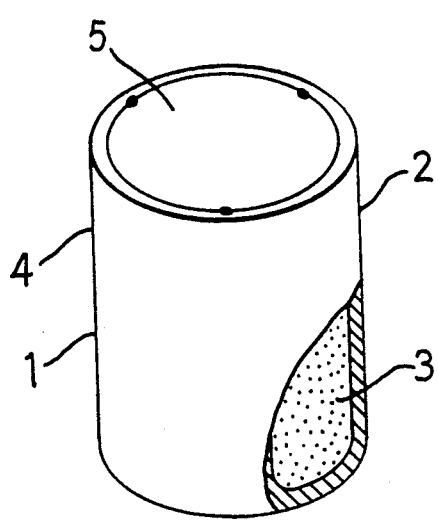
Figure 3:
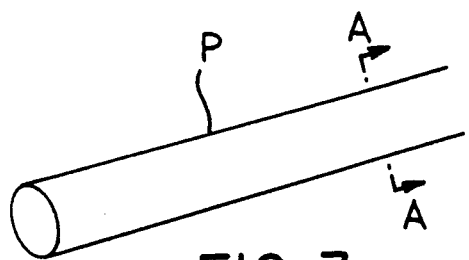

The copper alloy matrix used in the composite material according to the invention may be any copper alloy. Specific and preferable examples include JIS high strength brass, brass, aluminum bronze and the like.

The solid materials or additives having self-lubricity include, for example, graphite including artificial graphite, lead, $MoS_2$, WS and the like. These materials are used in the form of a powder having a size of from 0.1 to 500 m and may be used singly or in combination. When the self-lubricating solid material is in a state of boundary lubrication, it serves as lubricant, thereby preventing sliding members from being seized with members in contact. In this sense, the term "self-lubricity" used herein means anti-seizing properties.

The solid materials capable of imparting a wear resistance to the copper alloy include ceramics in the form of nitrides, carbides and oxides such as SiC, BN, SiN, $Al_2O_3$, $Cr_2O_3$, $SiO_2$ and the like. These materials may be used singly or in combination and are added to the alloy matrix in the form of a powder having a size of from 0.1 to 500 $\mu$m.

For the preparation of the Cu alloy matrix, the self-lubricating material and/or the wear-resistant materials both in the form of powder is added to a copper alloy powder having a size of from 0.1 to 500 $\mu$m. The mixture is subjected to hot extrusion or forging or other processing to obtain a copper alloy composite materials wherein the additive or additives are uniformly mixed. The preparation will be more particularly described in examples appearing hereinafter.

The total amount of the additives is generally in the range of from 0.1 to 10% by weight of the alloy composite material. If the amount is less than 0.1% by weight, any appreciable effect of the addition will not be expected. Over 10% by weight, the ductility of the resultant composite material considerably lowers.

It will be noted that if a composite material wherein a wear-resistant material is added in large amounts is employed as a bearing material, a disadvantage may be produced in that the opposite member that contacts the bearing material will become worn. To avoid this, the mixing ratio of the self-lubricating material and the wear-resistant material should be properly determined depending on the purpose of the resultant composite material.

The copper alloy composite material obtained by mixing a copper alloy and at least one additive has mechanical properties, such as tensile strength, load bearing properties, elongation and hardness, improved by 10 to 30%. As a matter of course, the wear resistance and the anti-seizing properties are significantly improved.

The present invention is more particularly described by way of examples.

EXAMPLE 1

An experiment was conducted using different starting materials and different amounts of these materials indicated in Table 1. In the experiment, hot extrusion was used to prepare copper alloy composite materials P. The hot extrusion is illustrated in FIGS. 1 to 4 and these figures are first described.

FIG. 1 shows a billet-shaped composite material-packing capsule 1 which is placed an extruder, in which a powder 3 of a copper alloy composite material is hermetically filled in a metallic capsule 2. The mixing ratios of the respective powders 3 used in this example are as indicated in Table 1. Twelve powders were used for the experiment.

The metallic capsule 2 has a cylindrical container 4 with an outer diameter of 140 mm and a circular cover 5 is fitted in an opening of the container 4. The container 4 and the cover 5 are, respectively, made of aluminum bronze and have a thickness of 5 mm. After filling the powder 3 of the composite material in the container, the cover is placed and caulked with a hammer, followed by spot welding at three points so that the cover is not removed.

For preventing the removal of the cover 5, the electron beam welding may be used, in which after evacuation, the electron beam welding is performed.

The capsule 1 in which the composite material powder 3 has been filled is preheated at a temperature of 800° C. After arrival at the temperature, the capsule is placed in an extruder 8 in FIG. 2.

Figure 2:
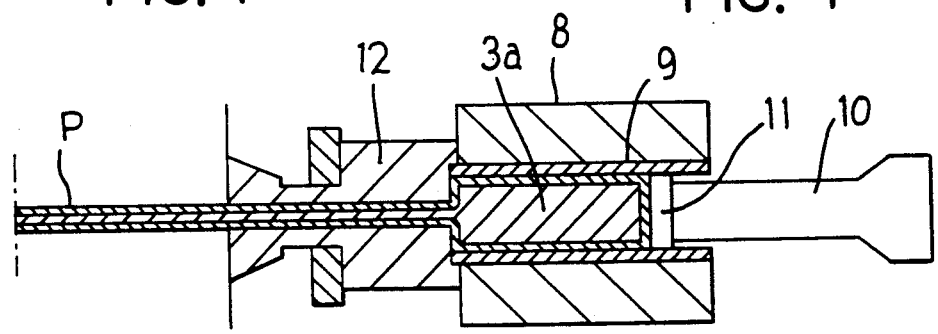

In FIG. 2, there is shown the capsule 1 which is placed in a container 9 of the extrusion press 8 and is extruded through a die 12 by means of a dummy block 11 provided at the tip of a stem 10. In the container 9, the composite material 3a is in a compressed condition and is stretched by means of the die 12. As a consequence, the additive or additives are uniformly mixed in the copper alloy.

Figure 8:
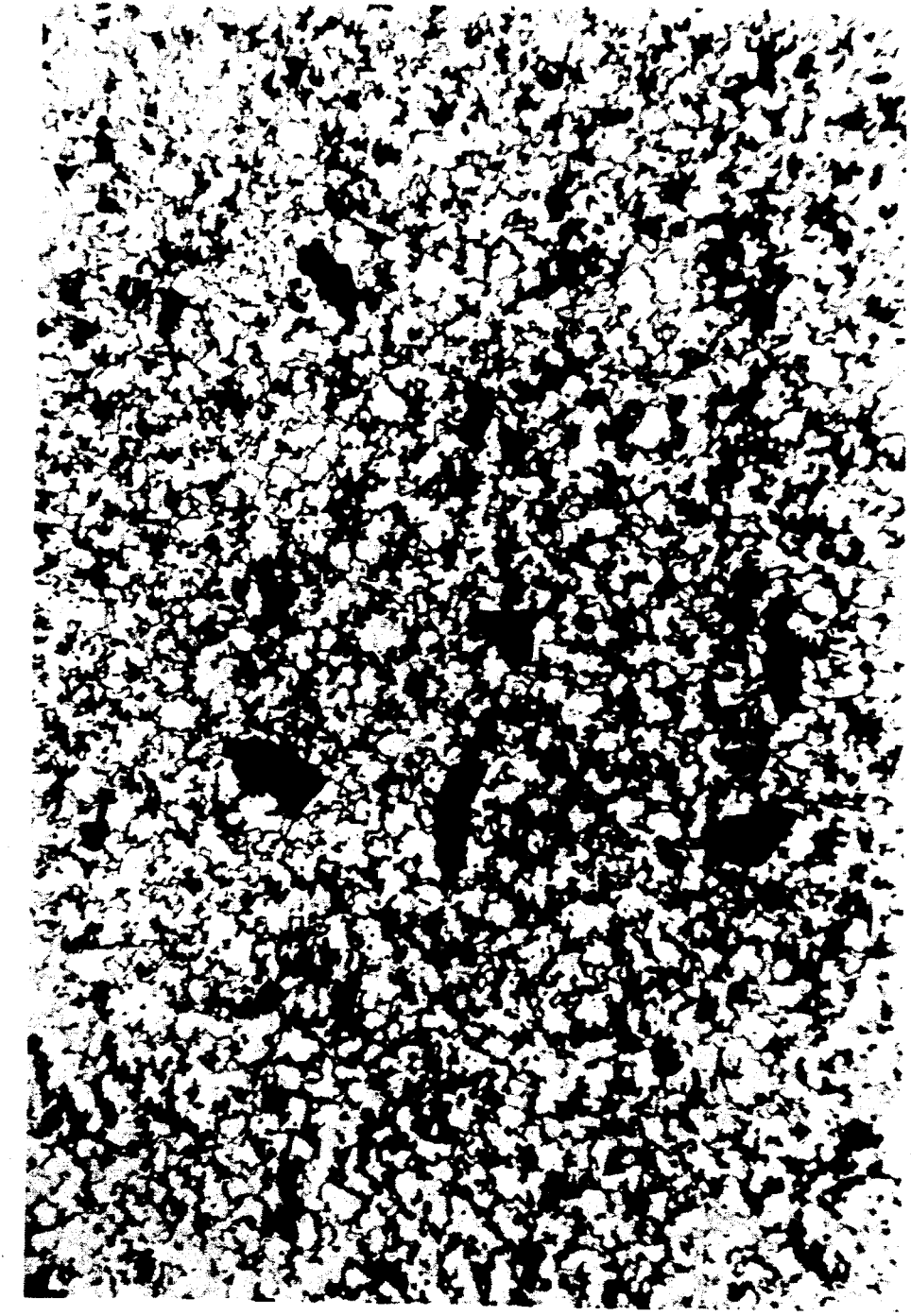
FIGS. 8 and 9 are, respectively, microphotographs of microstructures of composite materials (1) and (3) obtained in Examples of the present invention.
Figure 9:
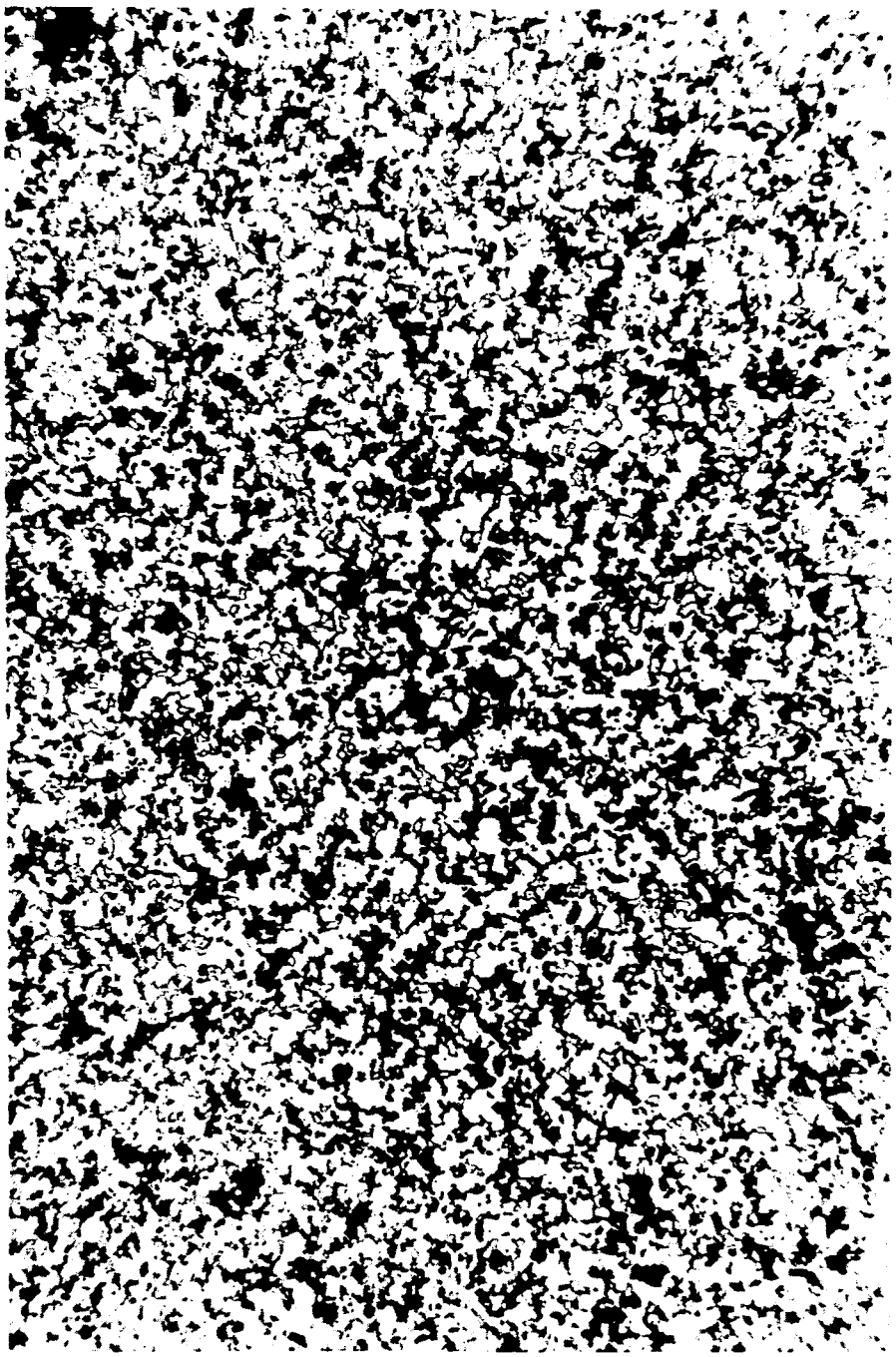

FIGS. 8 and 9 show microphotographs of microstructures of the composite materials (1) and (3) obtained in this example. The composite material (1) contains 1 wt% of artificial graphite powder with a size of 30 μm and 5 wt% of $Al_2O_3$ powder with a size of 2 μm. In FIG. 8, black coarse particles dispersed in the matrix are particle of the artificial graphite and black fine particles are those of $Al_2O_3$. The composite material (2) contains 3 wt% of $Al_2O_3$ powder with a size of 2 μm. In FIG. 9, black fine particles are those of $Al_2O_3$.

From these photographs, it will be seen that the respective additives are uniformly dispersed in the copper alloy base metal or matrix.

Figure 4:
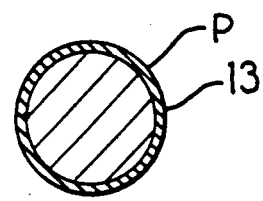

A rod-shaped copper alloy composite material P with a diameter of 30 mm is extruded from the die 12. When the composite material is extruded along with the metallic capsule 2, the material for the capsule covers the copper alloy composite material P as a surface skin 13 as shown in FIG. 4. If the copper alloy composite material P is used, it may be used as it is or after removal of the surface skin 13. The surface skin can be readily removed by cutting.

The copper alloy composite material (1) to (12) were subjected to measurements of mechanical properties and wear resistance. The results are shown in Table 2.

In Table 2, the results of conventional products A and B are also shown.

As will be apparent from the results, the copper alloy composite materials of the invention are improved in strength (tensile strength, proof stress, elongation and hardness) by 10 to 30% and are also significantly improved in wear resistance and anti-seizing properties.

In the above example, the container 4 of the metallic capsule 2 has a bottom. A hollow cylinder may be used as the container and sealed with a cover 5 at opposite ends.

EXAMPLE 2

Figure 5:
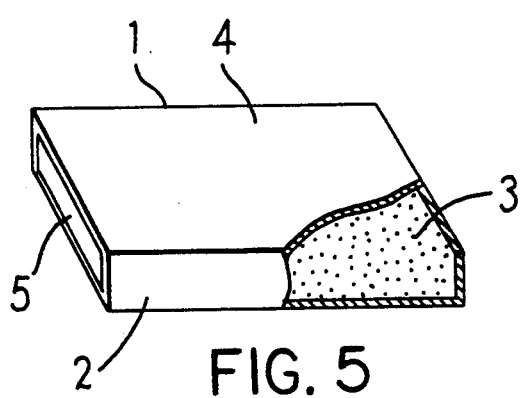
Figure 6:
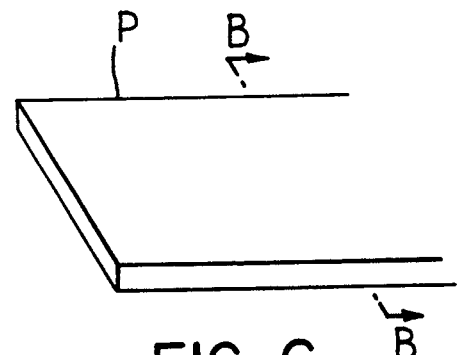
Figure 7:
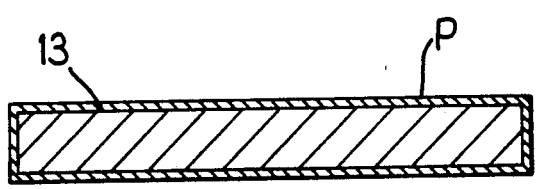

FIGS. 5 to 7 shows preparation of the composite material by hot forging. In this case, the metallic capsule has the form of a box for permitting easy forging. The container 4 is filled with the powder 3 of a composite material and the cover 5 is caulked and fixed by electron beam welding.

By the hot forging, additives could be uniformly dispersed in a copper alloy matrix by compression and stretching actions. Accordingly, similar results as in Example 1 were obtained. In this case the copper alloy composite material P was covered with a material of the metallic capsule 2 and the surface skin 13 could be cut away in use, if necessary.

Although the invention has been described in its preferred form with a certain degree of particularity, it is to be understood that many variations and changes are possible in the invention without departing from the scope thereof.

TABLE 1

| | | Mixing Ratios in Copper Alloy Composite Materials (wt %) | | | | | | | |
|---|---|---|---|---|---|---|---|---|---|
| | | Self-Lubricating Powder | | | | Wear-resistant Powder | | | |
| Compsite Material No. | Copper Alloy Powder | Artificial Graphite (30 μm) | Lead (10 μm) | $MoS_2$ (10 μm) | $WS_2$ (20 μm) | $Al_2O_3$ (2 μm) | SiC (5 μm) | SiN (10 μm) | BN (5 μm) |
| 1 | HBsCl | 1 | | | | 5 | | | |
| 2 | " | 2 | | | | 4 | | | |
| 3 | " | | | | | 3 | | | |
| 4 | " | | 1 | 2 | | 2 | 1 | 1 | 1 |
| 5 | " | | | | 1 | 1 | | 2 | |
| 6 | " | 1 | | 1 | | | | | 2 |
| 7 | AlBC-3 | 1 | | | | 5 | | | |
| 8 | " | 2 | | | | 4 | | | |
| 9 | " | | | | | 3 | | | |
| 10 | " | | 1 | 2 | | 2 | 1 | 1 | 1 |
| 11 | " | | | | 1 | | | 2 | |
| 12 | " | 1 | | 1 | | | | | 2 |

Note)
HBsC-1 Zn = 36%, Mn = 1.0%, Fe = 0.7%, Al = 0.7%, Cu = balance
AlBC-3 Al = 9.5%, Mn = 0.5%, Fe = 4.5%, Ni = 4.5%, Cu = balance

TABLE 2

| | Tensile Strength (kgf/mm$^2$) | 0.2% Load Bearing Capacity (kgf/mm$^2$) | Test Results Elongation (%) | Hardness (HRB) | Fabiry Wear Test Wear Resist Wear Loss (mm$^3$) | Antiseizing Property (kgf · sec) |
|---|---|---|---|---|---|---|
| (1) | 58 | 27 | 7 | 75 | 0.7 | 5,200 |
| (2) | 56 | 25 | 8 | 73 | 1.2 | 8,300 |
| (3) | 55 | 23 | 14 | 72 | 2.1 | 6,200 |
| (4) | 51 | 22 | 6 | 73 | 1.2 | 8,400 |
| (5) | 53 | 24 | 9 | 73 | 1.4 | 7,300 |
| (6) | 55 | 25 | 10 | 72 | 1.6 | 8,200 |
| (7) | 73 | 35 | 3 | 93 | 0.2 | 26,000 |
| (8) | 72 | 33 | 3 | 90 | 0.5 | 31,200 |
| (9) | 70 | 30 | 7 | 88 | 0.8 | 28,600 |
| (10) | 69 | 30 | 5 | 90 | 0.3 | 27,000 |
| (11) | 71 | 32 | 3 | 90 | 0.5 | 29,000 |
| (12) | 72 | 32 | 5 | 89 | 0.6 | 26,500 |
| A | 51 | 20 | 37 | 68 | 2.6 | 5,100 |
| B | 68 | 28 | 20 | 85 | 1.1 | 25,100 |

A: Comparative material JIS HBsC-1
B: Comparative material JIS AlBC-3

What is claimed is:

1. A shaped, copper alloy material which has been prepared by hot working a mixture of powders encapsulated in a hermetically sealed metal jacket so as to apply compression and stretching actions on said mixture to effect uniform dispersion thereof, said mixture of powders consisting essentially of from about 0.1 to 10 wt% of additive material powder and the balance is copper alloy powder, said additive material powder being selected from the group consisting of solid materials having self-lubricating properties, solid materials having wear-resistant properties and mixtures thereof.

2. A copper alloy composite material according to claim 1, wherein said additive material powder is a solid material having self-lubricating properties.

3. A copper alloy composite material according to claim 2, wherein the solid material having self-lubricating properties is a member selected from the group consisting of graphite, lead, MoS$_2$, WS and mixtures thereof and is used in an amount of from 0.1 to 10 wt% based on the composite material.

4. A copper alloy composite material according to claim 2, wherein the solid material having self-lubricating properties is in the form of a powder having a particle size of from 0.1 to 500 micrometers.

5. A copper alloy composite material according to claim 1, wherein said additive material powder is a wear-resistant solid material and is contained in an amount of from 0.1 to 10 wt% based on the composite material.

6. A copper alloy composite material according to claim 5, wherein the wear-resistant solid material is a ceramic material in the form of a powder having a particle size of from 0.1 to 500 micrometers.

7. A copper alloy composite material according to claim 6, wherein the ceramic material is a member selected from the group consisting of SiC, BN, SiN, Al$_2$O$_3$, Cr$_2$O$_3$, SiO$_2$ and mixtures thereof.

8. A copper alloy composite material according to claim 1, wherein said additive material powder is a mixture of a solid material having self-lubricating properties and a wear-resistant solid material and is used in a total amount of from 0.1 to 10 wt% based on the composite material.

9. A copper alloy composite material according to claim 8, wherein the mixture is the form of powder each having a size of from 0.1 to 500 micrometers.

10. A copper alloy composite material according to claim 8, wherein the solid material having self-lubricating properties is a member selected from the group consisting of graphite, lead, MoS$_2$, WS and mixtures thereof and the wear-resistant material is a ceramic material.

11. A copper alloy composite material as claimed in claim 1, wherein the encapsulated mixture of powders is hot worked and plastically molded into a desired shape by hot extrusion.

12. A copper alloy composite material as claimed in claim 1, wherein the encapsulated mixture of powders is hot worked and plastically molded into a desired shape by hot foregoing.

13. A copper alloy composite material encapsulated by a hermetically sealed metal jacket, said composite material consisting essentially of a mixture of from about 0.1 to 10 wt% of additive material powder and the balance is copper alloy powder, said additive material powder being selected from the group consisting of solid materials having self-lubricating properties, solid materials having wear-resistant properties and mixtures thereof.

14. A copper alloy composite material which is a mixture of powders consisting essentially of from about 0.1 to 10 wt% of additive material powder having a particle size of from 0.1 to 500 micrometers and the balance is copper alloy powder, said additive material powder being selected from the group consisting of SiC, BN, SiN, Al$_2$O$_3$, Cr$_2$O$_3$, SiO$_2$ and mixtures thereof.

15. A method of preparing a copper alloy composite material which comprises preparing a mixture of powders consisting essentially of from about 0.1 to 10 wt% of additive material powder and the balance is copper alloy powder, said additive material powder being selected from the group consisting of solid materials having self-lubricating properties, solid materials having wear-resistant properties and mixtures thereof, encapsulating said mixture of powders in a hermetically sealed metal jacket and then hot working said jacket containing said mixture of powders so as to apply compression and stretching actions on said mixture to effect uniform dispersion thereof.

16. A method as claimed in claim 15 wherein the encapsulated mixture of powders is hot worked and plastically molded into a desired shape by hot extrusion.

17. A method as claimed in claim 15 wherein the encapsulated mixture of powders is hot worked and plastically molded into a desired shape by hot forgoing.

18. A method as claimed in claim 15 including the step of removing the metal jacket from the mixture of powder after said hot working step.

* * * * *

UNITED STATES PATENT AND TRADEMARK OFFICE
CERTIFICATE OF CORRECTION

PATENT NO. : 5 089 354
DATED : February 18, 1992
INVENTOR(S) : Kunio Nakashima et al It is certified that error appears in the above-identified patent and that said Letters Patent is hereby corrected as shown below:

On the title page; change the Assignee to read
---Chuetsu Metal Works Co., Ltd.---.

Column 5, line 21; after "alloy" insert ---composite---.
Column 6, line 30; change "foregoing" to ---forging---.
Column 6, line 65; change "forgoing" to ---forging---.

Signed and Sealed this

Twenty-first Day of September, 1993

Attest:

BRUCE LEHMAN

Attesting Officer     Commissioner of Patents and Trademarks